R. M. GRUPE AND T. S. HUNT.
LEVER LOCK.
APPLICATION FILED SEPT. 17, 1918.
1,341,504.  Patented May 25, 1920.
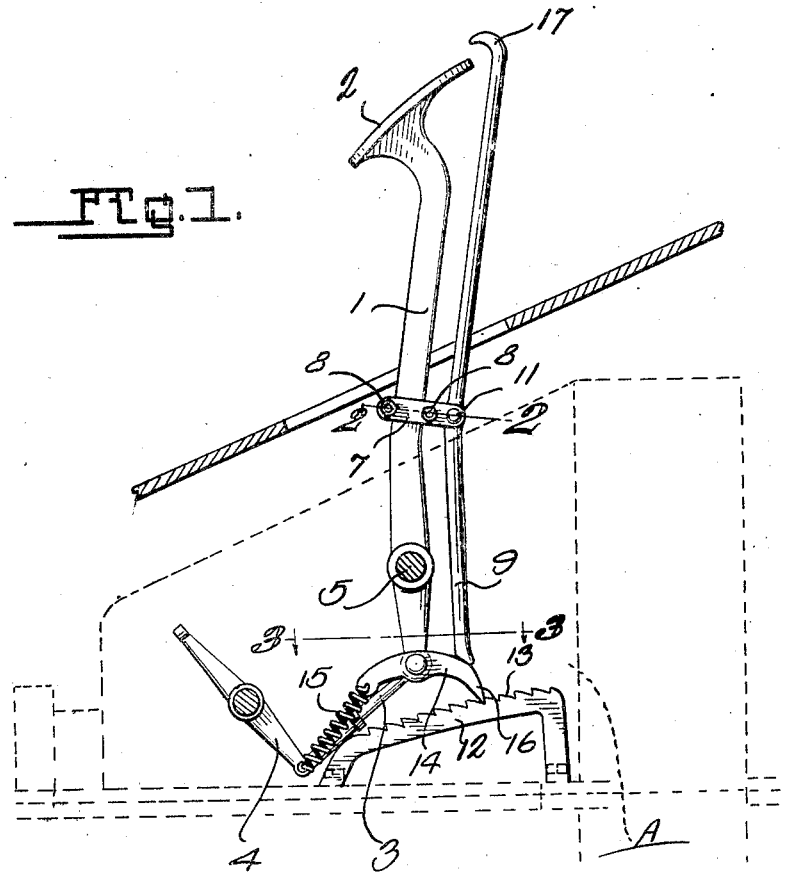
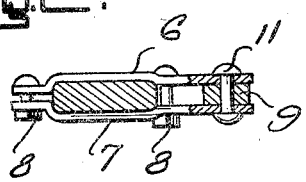
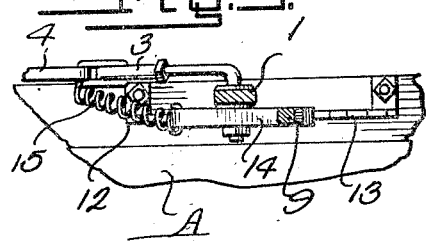
Roy M. Grupe, Inventor
and
Thomas S. Hunt

UNITED STATES PATENT OFFICE.

ROY M. GRUPE AND THOMAS S. HUNT, OF BROADVIEW, MONTANA.

LEVER-LOCK.

1,341,504.  Specification of Letters Patent.  Patented May 25, 1920.

Application filed September 17, 1918. Serial No. 254,459.

*To all whom it may concern:*

Be it known that we, ROY M. GRUPE and THOMAS S. HUNT, citizens of the United States, and residents of Broadview, in the county of Yellowstone and State of Montana, have invented certain new and useful Improvements in Lever-Locks, of which the following is a specification.

This invention relates to a lock for the low speed lever or pedal of Ford automobiles and an object of the invention is to provide a lock as specified which is simple in construction, may be economically manufactured, and applied to any Ford automobile for locking the pedal or foot lever against accidental operation.

In operating Ford automobiles, it is necessary to hold one foot upon the low speed clutch operating pedal or lever when operating in low speed. When running the car continuously, at low speed, this maintaining of pressure upon the pedal becomes tiresome particularly in the operating of Ford automobiles which have truck bodies thereon wherein it is necessary to practically operate the car at low speed, at all times; and it is an object of this invention to provide a lock by means of which the said foot lever or treadle may be locked, to hold the low speed clutch in operation, which locking mechanism is operated by a slight forward movement of the foot of the operator, along the treadle, and move it into an inoperative position by forward pressure upon the treadle.

Other objects of the invention will appear in the following detailed description, taken in connection with the accompanying drawing, forming a part of this specification, and in which drawing:

Figure 1 is a side elevation of the low speed clutch operating lever, showing the locking means applied thereto.

Fig. 2 is a section on the line 2—2 of Fig. 1.

Fig. 3 is a horizontal section on the line 3—3 of Fig. 1.

Referring more particularly to the drawing, 1 indicates the foot lever of a Ford automobile which controls or operates the low speed clutch mechanism and which has a foot treadle 2 carried upon the upper ends thereof. The lower end of the lever 1 has a connection 3, connected thereto which is in turn connected to the clutch operating arm 4. The lever 1 is pivotally mounted as shown at 5 and it has a pair of metal straps 6 and 7 attached thereto by means of clamping bolts 8, intermediate its fulcrum 5 and upper end upon which the foot treadle 2 is positioned. The straps 6 and 7 project beyond the forward edge of the lever 1 and have a rod or lever 9 pivotally connected thereto as shown at 11.

A ratchet or quadrant 12 is attached to the gear casing indicated at A, and it has its teeth 13 presented for engagement with the tapered end of a pawl 14. The pawl 14 is pivotally carried by the lower end of the lever 1 and it has a spiral spring 15 connected thereto for normally holding the tapered end 16 of the pawl out of engagement with the ratchet teeth 13. The lower end of the pivoted lever 9 is positioned for movement into engagement with the pawl 14 to force the tapered end 16 thereof into engagement with one of the ratchet teeth 13, upon forward movement of the upper end 17 of the lever 9. The upper end 17 of the lever projects above the upper forward end of the treadle 2, so that the operator of the automobile, may, by slight forward movement of his foot upon the treadle 2 operate the lever 9, to force the pawl 14 into engagement with one of the ratchets 13 to hold the clutch operating lever 1 against accidental movement. The pawl 14 is released, for movement under action of the spiral spring 15, when the lever 1 is moved forward.

Changes in details may be made without departing from the spirit of this invention; but,

We claim:

The combination with the low speed clutch operating foot lever of an automobile, of a pawl pivotally mounted intermediate its ends upon the lower end of said lever, and having a convexed upper edge, a ratchet adapted to be engaged by said pawl to lock the lever against accidental pivotal movement, a second lever, a pair of clamping plates pivotally supporting said second lever and clamped to the foot lever intermediate its ends, said second lever having its lower end shaped to lie in facial abutment with a portion of the convexed edge of said pawl, and a spiral spring connected to one end of said pawl for moving the pawl out of engagement with said ratchet.

ROY M. GRUPE.
THOMAS S. HUNT.